(12) United States Patent
Takahashi

(10) Patent No.: US 12,263,675 B2
(45) Date of Patent: Apr. 1, 2025

(54) PRINTING APPARATUS

(71) Applicant: BROTHER KOGYO KABUSHIKI KAISHA, Nagoya (JP)

(72) Inventor: Hiroaki Takahashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 41 days.

(21) Appl. No.: 18/065,764

(22) Filed: Dec. 14, 2022

(65) Prior Publication Data

US 2023/0116151 A1 Apr. 13, 2023

Related U.S. Application Data

(63) Continuation of application No. PCT/JP2021/023168, filed on Jun. 18, 2021.

(30) Foreign Application Priority Data

Jul. 8, 2020 (JP) .................................. 2020-117765

(51) Int. Cl.
*B41J 11/66* (2006.01)
*B41J 11/70* (2006.01)

(52) U.S. Cl.
CPC .............. *B41J 11/663* (2013.01); *B41J 11/70* (2013.01)

(58) Field of Classification Search
CPC ... B41J 3/60; B41J 11/66; B41J 11/663; B41J 11/70
See application file for complete search history.

(56) References Cited

U.S. PATENT DOCUMENTS

2017/0028747 A1* 2/2017 Kanda ..................... B41J 3/4075
2018/0281479 A1 10/2018 Ito et al.

FOREIGN PATENT DOCUMENTS

| JP | H04120055 U | 10/1992 |
| JP | 2004249465 A * | 9/2004 |
| JP | 2017030249 A | 2/2017 |
| JP | 2018171727 A | 11/2018 |
| JP | 2018186448 A | 11/2018 |

OTHER PUBLICATIONS

Uchiyama, MachineTranslationofJP-2004249465-A, 2004 (Year: 2004).*

(Continued)

*Primary Examiner* — Scott A Richmond
(74) *Attorney, Agent, or Firm* — Scully, Scott, Murphy & Presser, PC

(57) ABSTRACT

There is provided a printing apparatus including: a holder; an image recorder; a receiver; a cutter; a first conveyor; and a controller. The controller is configured to execute: a first conveying process of conveying a recording medium by the first conveyor along a first conveying direction to the image recorder; an image recording process of recording an image on the recording medium by the image recorder; a second conveying process of conveying the recording medium with the image recorded in a second conveying direction opposite to the first conveying direction by a predetermined amount, after the image recording process; and a cutting process of cutting the recording medium by the cutter, after the second conveying process.

7 Claims, 11 Drawing Sheets

(56) References Cited

OTHER PUBLICATIONS

Japanese Reasons for Refusal dated Feb. 13, 2024 from related JP 2020-117765 together with an English language translation.
International Search Report dated Sep. 7, 2021 issued in PCT/JP2021/02316.
Translation of International Preliminary Report on Patentability and Written Opinion dated Jan. 10, 2023 from related International Application No. PCT/JP2021/023168.
International Search Report dated Sep. 7, 2021 issued in PCT/JP2021/023168.
Japanese Reasons for Refusal dated Jun. 4, 2024 from related JP 2020-117765 together with an English language translation.

* cited by examiner

PRINTING APPARATUS

REFERENCE TO RELATED APPLICATIONS

This application is a Continuation Application of International Application No. PCT/JP2021/023168 claiming the conventional priority of Japanese patent Application No. 2020-117765 filed on Jul. 8, 2020, and titled "PRINTING DEVICE". The entire contents of Japanese patent Application No. 2020-117765 and International Application No. PCT/JP2021/023168 are incorporated herein by reference.

BACKGROUND ART

Conventionally, there have been image forming apparatuses including a cutting unit that cuts a sheet on which an image has been formed. For example, in the image forming device described in Japanese Patent Application Laid-Open No. 2018-186448, a sheet after an image is formed by the image forming unit is cut into two equal portions by a sheet cutting unit provided at a position downstream in the sheet conveying direction of the image forming unit.

DESCRIPTION

In the image forming device of Japanese Patent Application Laid-Open No. 2018-186448, if the position of the sheet cutting unit in the sheet conveying direction is made closer to the image forming unit, then it is necessary to cut the sheet before the image forming unit finishes forming of the image on the sheet. In this case, there is a risk of image quality deterioration such as image deviation due to deviation of sheet position during cutting.

The present disclosure is made to solve the above-mentioned problem, an object of the present disclosure is to realize a printing apparatus capable of cutting recording medium without deteriorating the quality of image recording.

A printing apparatus according to an aspect of the present disclosure includes: a holder configured to accommodate a recording medium; an image recorder configured to record an image on the recording medium; a receiver to which the recording medium with the image recorded by the image recorder is to be discharged; a cutter arranged on a receiver-side of the image recorder, the cutter being configured to cut the recording medium at a cutting position, the receiver-side being a side of the image recorder at which the receiver is positioned; a first conveyor configured to convey the recording medium along a first conveying direction, the first conveying direction being a direction in which the recording medium passes through the cutting position in a period in which recording of the image on the recording medium is performed by the image recorder.

Then, the controller is configured to execute: a first conveying process of conveying the recording medium by the first conveyor along the first conveying direction to the image recorder; an image recording process of recording the image on the recording medium by the image recorder; a second conveying process of conveying the recording medium with the image recorded in a second conveying direction opposite to the first conveying direction by a predetermined amount, after the image recording process; and a cutting process of cutting the recording medium by the cutter, after the second conveying process.

According to the printing apparatus having the configuration described above, the controller cuts the recording medium after the image is recorded thereon in the image recording process by the cutter after the recording medium has been conveyed in the second conveying direction in the second conveying process. Thus, image deviation and the like, that would be otherwise occurred by cutting the recording medium during the image recording process, can be prevented from occurring. Therefore, the paper P on which image has been recorded can be cut without deteriorating the quality of image recording.

The controller performs the cutting process after conveying the recording medium in the second conveying direction opposite to the first conveying direction in the second conveying process. Thus, even if the position of the cutter and the position of the image recorder are made closer to each other in the first conveying direction, it is possible to cut the recording medium after the image recording process is completed. Therefore, by making the position of the cutter and the position of the image recorder closer to each other in the first conveying direction, the size of the printing apparatus can be reduced.

According to an aspect of the present disclosure, a printing apparatus capable of cutting a recording medium without deteriorating the quality of image recording can be realized.

FIRST EMBODIMENT

The printing apparatus 1 according to the first embodiment of the present disclosure is described below with reference to FIG. 1 to FIG. 8.

Configuration of the Printing Apparatus

Figure 1:
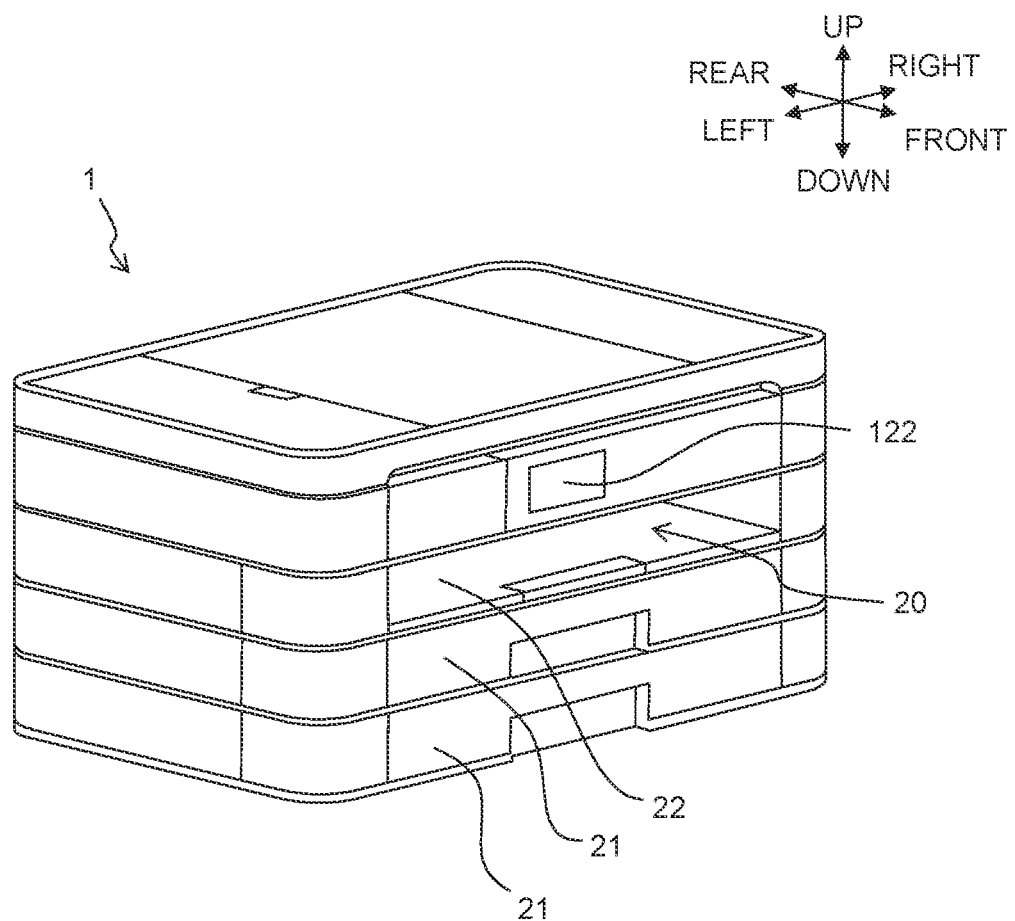
FIG. 1 depicts an external appearance of a printing apparatus.
Figure 2:
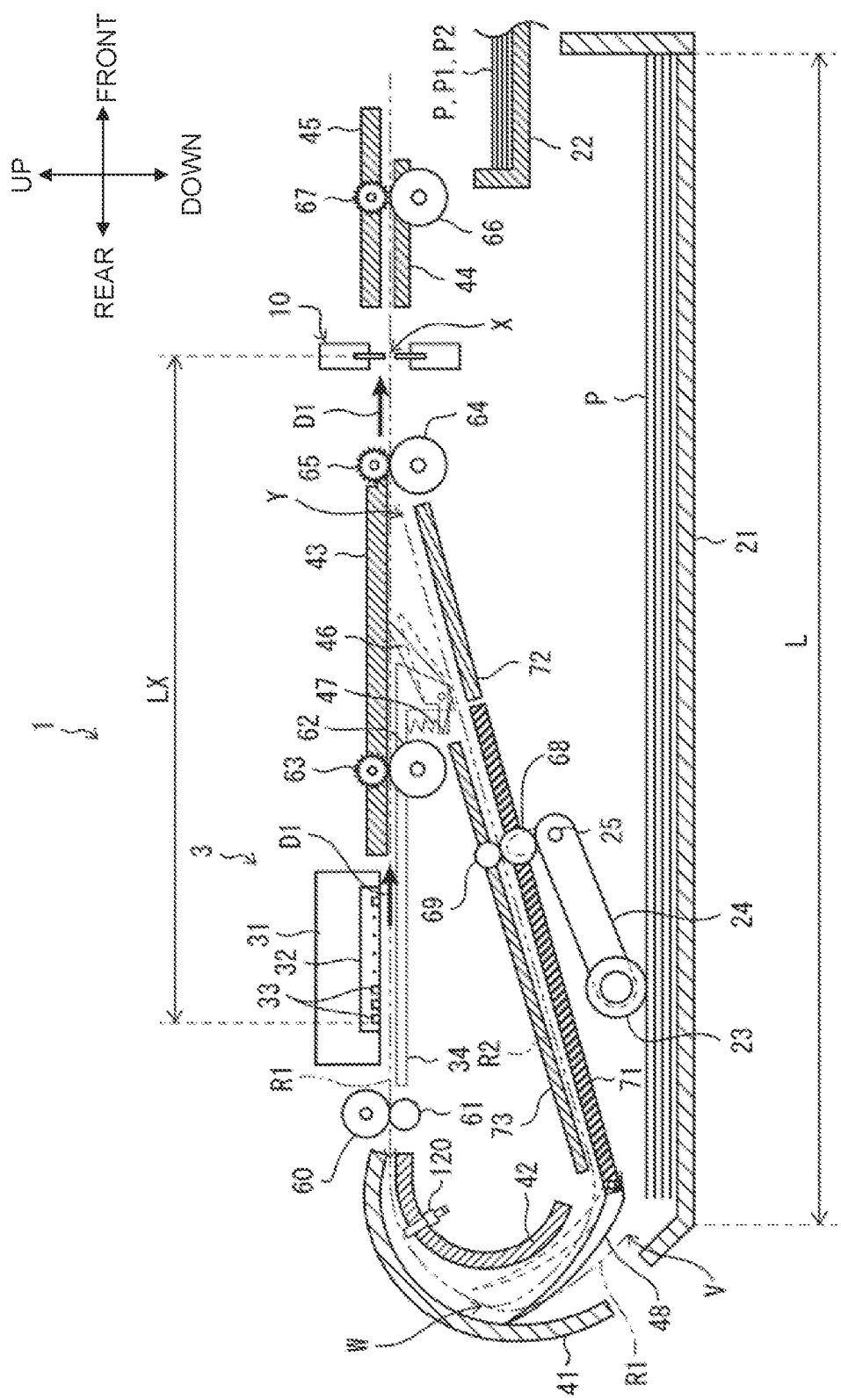
FIG. 2 is a cross-sectional view depicting an internal structure of the printing apparatus.

FIG. 1 depicts the external appearance of the printing apparatus 1 according to the first embodiment. FIG. 2 is a cross-sectional view depicting the internal structure of the printing apparatus 1. The printing apparatus 1 depicted in FIG. 1 is a MFP (Multi-Function Peripheral) equipped with multiple functions such as printing, scanning, copying, and fax functions. For convenience of explanation, the up-down direction, the left-right direction, and the front-rear direction of the printing apparatus 1 are defined as indicated by the arrows in FIG. 1.

The printing apparatus 1 has a print function of an inkjet system that records a print data indicated by a print job onto a paper P (an example of a recording medium) by discharging (ejecting) ink, for example. The image to be printed on paper P may be color printable or dedicated for monochrome printing. The recording medium is not limited to paper medium, but may also be resin medium such as OHP sheets, for example.

As depicted in FIG. 1, an opening 20 is formed in the front surface of the printing apparatus 1. In this opening 20, feeding trays 21 being an example of a holder, and a discharge tray 22 being an example of a receiver, are detachably arranged. The feeding trays 21 are each a tray for accommodating multiple sheets of paper P and is open at the top. In the example depicted in FIG. 1, two feeding trays 21 are arranged in the up-down direction. The upper feeding tray 21 accommodates, for example, A4 size paper P. On the other hand, the lower feeding tray 21 accommodates, for example, A3 size paper P.

As also depicted in FIG. 2, the discharge tray 22 is located above the upper feeding tray 21. The discharge tray 22 is a tray for accommodating the paper P, the first paper P1, and the second paper P2 discharged by the conveying roller 66, and is open at the top. In the example depicted in FIG. 2, the lower feeding tray 21 is omitted from depicting for convenience of explanation.

On the front surface of the printing apparatus 1, a setting unit (interface) 122 having a display screen is provided, as depicted in FIG. 1. The setting unit 122 composed of a touch panel, for example, and is configured to allow a user to preform various settings related to printing by the printing apparatus 1 via the user's touch operation. The setting unit 122 accepts settings regarding the size of the paper P and whether the cutting process is to be executed or not. The information set by the setting unit 122 is output to a controller 100 (see FIG. 3).

As depicted in FIG. 2, the printing apparatus 1 includes a feeding roller 23, a first conveying route (path) R1, conveying rollers 60, 62, 64, 66, 68, a first flap 46, a second flap 48, a second conveying route R2, and a cutting unit (cutter) 10. Here, the conveying rollers 60, 62, 64, 66 are an example of a first conveyor. The conveying rollers 64, 66, 68 are an example of a second conveyor. The number of rollers provided in the first conveying route R1 and the second conveying route R2 can be changed as appropriate. For example, the conveying roller 66 may be omitted.

A feeding roller 23 is a roller for feeding the paper P accommodated in the feeding tray 21 to a conveying start position V of the first conveying route R1. The feeding roller 23 is rotatably supported by the front end of a feeding arm 24. The feeding arm 24 is rotatably supported on a shaft 25 supported by the frame of the printing apparatus 1. The feeding roller 23 rotates positively (that is, rotates in forward or normal direction) when a feeding motor 107 (see FIG. 3) is driven. As the feeding roller 23 rotates positively, the papers P stored in the feeding tray 21 is fed one by one to the conveying start position V of the first conveying route R1.

The first conveying route R1 is the route that extends upward from the rear end of the feeding tray 21, curves in the area defined by guiding members 41, 42, extends via the position at which the image recording unit (image recorder) 3 is located, extends straightly in the area defined by guiding members 43, 44, 45, and reaches the discharge tray 22. In the first embodiment, a first conveying direction D1 is a direction in which the paper P passes (moves) through a cutting position X, when an image is being recorded on the paper P by the image recording unit 3. That is, the first conveying direction D1 is the direction proceeding from the image recording unit 3 to the cutting position X.

A conveying roller 60 is arranged in the first conveying route R1 at a position upstream of the image recording unit 3 in the first conveying direction D1. A pinch roller 61 is arranged at a position opposing to the lower part of the conveying roller 60. The conveying roller 60 is driven by the conveying motor 108 (see, FIG. 3). The pinch roller 61 rotates owing to the rotation of the conveying roller 60. When the conveying roller 60 and the pinch roller 61 rotate positively, the paper P is pinched between the conveying roller 60 and the pinch roller 61, and is conveyed to the image recording unit 3.

The image recording unit 3 is provided in the first conveying route R1 at a position between the conveying roller 60 and the conveying roller 62, and records image(s) on the paper P. The image recording unit 3 includes a carriage 31, a recording head 32, nozzles 33, and a platen 34. The recording head 32 is mounted on the carriage 31. A plurality of nozzles 33 are provided on the lower surface of the recording head 32. The recording head 32 is configured to discharge (eject) ink droplets from the nozzles 33. The platen 34 is a rectangular plate-shaped member on which the paper P is to be placed. In the process in which the carriage 31 is moved relative to the paper P supported by the platen 34, the nozzles 33 selectively discharge the ink droplets to the paper P so that the image(s) is recorded on the paper P.

A driving force of the carriage motor 109 (see FIG. 3) is transmitted to the carriage 31, and thus the carriage 31 moves back and forth in the direction orthogonal to the first conveying direction D1 (that is, the widthwise direction of the paper P). The controller 100 records the image onto the paper P by repeatedly performing recording processes and line feed processes. In each of the recording process, a part of the image corresponding to one line is recorded on the paper P by discharging the ink from the nozzles 33 while moving the carriage 31 in the widthwise direction of the paper P under a condition that the conveying of the paper P is stopped. In each of the line feed processes, the paper P is conveyed as much as a predetermined line feed amount by rotating the conveying rollers 60, 62.

As depicted in FIG. 2, in the first conveying route R1, the conveying roller 62 is arranged at a position downstream of the image recording unit 3 in the first conveying direction D1. A spur roller 63 is arranged at a position opposing to the upper part of the conveying roller 62. The conveying roller 62 is driven by the conveying motor 108 (see FIG. 3). The spur roller 63 rotates owing to the rotation of the conveying roller 62. When the conveying roller 62 and the spur roller 63 rotate positively, the paper P is pinched between the conveying roller 62 and the spur roller 63, and is conveyed downstream in the first conveying direction D1.

In addition, in the first conveying route R1, at a position downstream of the conveying roller 62 in the first conveying direction D1, a conveying roller 64 is arranged. A spur roller 65 is arranged at a position opposing to the upper part of the conveying roller 64. The conveying roller 64 is driven by the conveying motor 108. The spur roller 65 rotates owing to the rotation of the conveying roller 64. When the conveying roller 64 and the spur roller 65 rotate positively, the paper P is pinched between the conveying roller 64 and the spur roller 65, and is conveyed to the cutting unit 10 side. On the other hand, when the conveying roller 64 and the spur roller 65 rotate in reverse direction (that is, rotate inversely), the paper P is pinched between the conveying roller 64 and the spur roller 65 and is conveyed into the second conveying route R2 along the under surface of the first flap 46.

The first flap 46 is provided at a position, in the first conveying route R1, between the conveying roller 62 and the conveying roller 64. The first flap 46 is located near the branching position Y that is opposite to the guiding member 43. The first flap 46 is supported by the platen 34 so that the first flap 46 is swingable between a first state and a second state. In the first state depicted in solid line in FIG. 2, the first flap 46 is in contact with the guiding member 43 so as to close the first conveying route R1. On the other hand, in the second state depicted by the dotted line in FIG. 2, the first flap 46 is positioned lower than the position in the first state, and is separated from the guiding member 43 so that the paper P conveyed in the first conveying direction D1 is allowed to pass through the space between the first flap 46 and the guiding member 43.

The first flap 46 is biased upwardly by a coil spring 47. The one end of the coil spring 47 is connected to the first flap 46 and the other end of the coil spring 47 is connected to the platen 34. The first flap 46 turns into the first state by being biased by the coil spring 47, and the front end of the first flap 46 abuts on the guiding member 43.

The cutting unit 10 is arranged in the first conveying route R1, at a position between the conveying roller 64 and the conveying roller 66. Specifically, the distance LX in the first conveying direction D1, from a cutting position X at which the cutting unit 10 cuts the paper P to a position of the nozzle(s) 33, of the plurality of nozzles 33, arranged most upstream in the first conveying direction is shorter than a half of the length L being the length of the feeding tray 21 in the front-rear direction. Here, the length L in the front-rear direction of the feeding tray 21 means a length from the front inner wall to the rear inner wall of the feeding tray 21.

Figure 6:
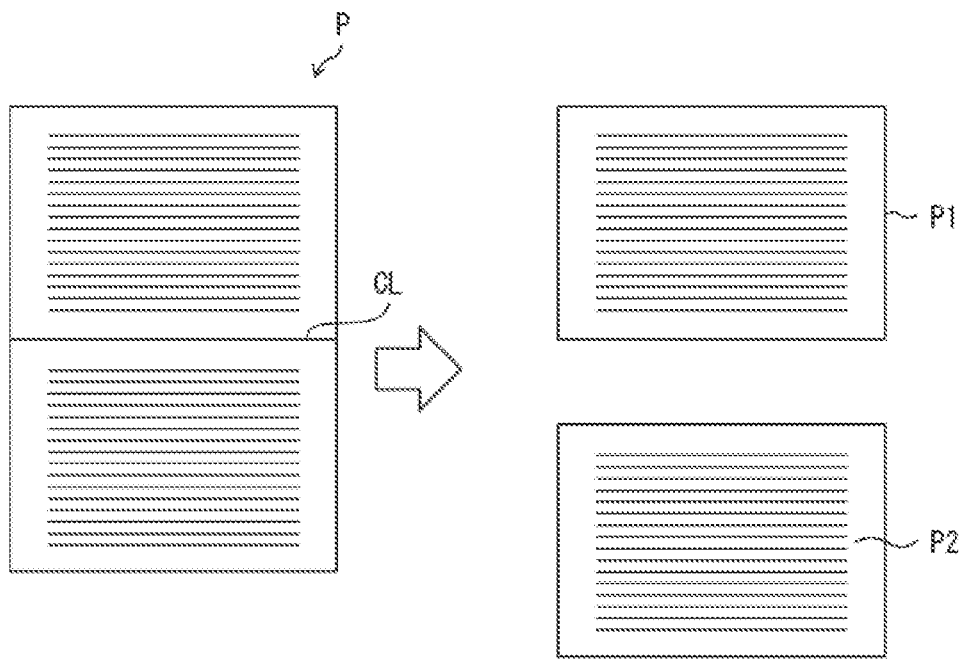
FIG. 6 depicts the paper before cutting and the first paper and the second paper after cutting.

The cutting unit 10 is a well-known cutter mechanism. The cutting unit 10 includes a pair of upper and lower blades and a cutter carriage, and is configured to cut the paper P by the upper and lower blades. Specifically, the cutting unit 10 cuts a predetermined position of the paper P in the widthwise direction of the paper P by moving the cutter carriage in the widthwise direction of the paper P. As depicted in FIG. 6, the cutting unit 10 cuts the paper P to separate the paper P into the first paper P1 and the second paper P2. The cutting unit 10 may be configured with only one blade being either one of the upper blade and the lower blade.

A conveying roller 66 is arranged, in the first conveying route R1, at a position downstream in the first conveying direction D1 of the cutting unit 10. A spur roller 67 is arranged at a position opposing to the upper part of the conveying roller 66. The conveying roller 66 is driven by the conveying motor 108 (see, FIG. 3). The spur roller 67 rotates owing to the rotation of the conveying roller 66. As the conveying roller 66 and the spur roller 67 rotate positively, the paper P, the first paper P1 and the second paper P2 are conveyed by the conveying roller 66 and discharged to the discharge tray 22.

As depicted in FIG. 2, a second flap 48 is arranged in a swingable manner at a merging position W where the first conveying route R1 and the second conveying route R2 merges with each other. Specifically, the second flap 48 is capable of swinging between a first state depicted by the solid line in FIG. 2 and a second state depicted by the dotted line in FIG. 2. When the second flap 48 is in the first state, the second flap 48 and the guiding member 42 constitute a part of the second conveying route R2. When the second flap 48 is in the second state, the second flap 48 and the guiding member 41 constitute a part of the first conveying route R1.

A register sensor 120 is provided, in the first conveying route R1, at a position upstream of the conveying roller 60. The register sensor 120 is a sensor that detects passing of the front or rear end of the paper P through a position at which the paper P contacts with the conveying roller 60. As the register sensor 120, it is possible to use a sensor having an actuator that oscillates when the paper P comes into contact with the actuator, an optical sensor, or the like.

The register sensor 120 outputs an ON signal in a state that the paper P is passing (moving) through the position where the register sensor 120 is disposed and outputs an OFF signal in a state that the paper P does not pass (move) through the position where the register sensor 120 is disposed. That is, from the timing when the front end of paper P reaches the position of the register sensor 120 to the timing when the rear end of paper P passes the position of the register sensor 120, the register sensor 120 outputs the ON signal, and in a period other than described above, the resister sensor 120 outputs the OFF signal. The detection signal of the register sensor 120 is output to the controller 100.

The conveying roller 60 is provided with a rotary encoder 121 that detects the rotation of the conveying roller 60. The rotary encoder 121 outputs a pulse signal to the controller 100 depending on the rotation of the conveying roller 60 (see, FIG. 3). The rotary encoder 121 includes an encoder disk and an optical sensor. The encoder disk rotates owing to the rotation of the conveying roller 60. The optical sensor reads the encoder disk being rotated, generates pulse signals, and outputs the generated pulse signals to the controller 100.

The second conveying route R2 is a route defined by guiding members 71, 72, 73, conveying roller 68, and a pinch roller 69, etc. The second conveying route R2 branches off from the branching position Y upstream from the conveying roller 64 in the first conveying route R1. The second conveying route R2 is connected to the merging position W positioned in the first conveying route R1 at a position upstream of the image recording unit 3 in the first conveying direction D1. This enables images to be recorded on both sides of the paper P in an image recording process (S4) described below.

Electrical Configuration of the Printing Apparatus

Figure 3:
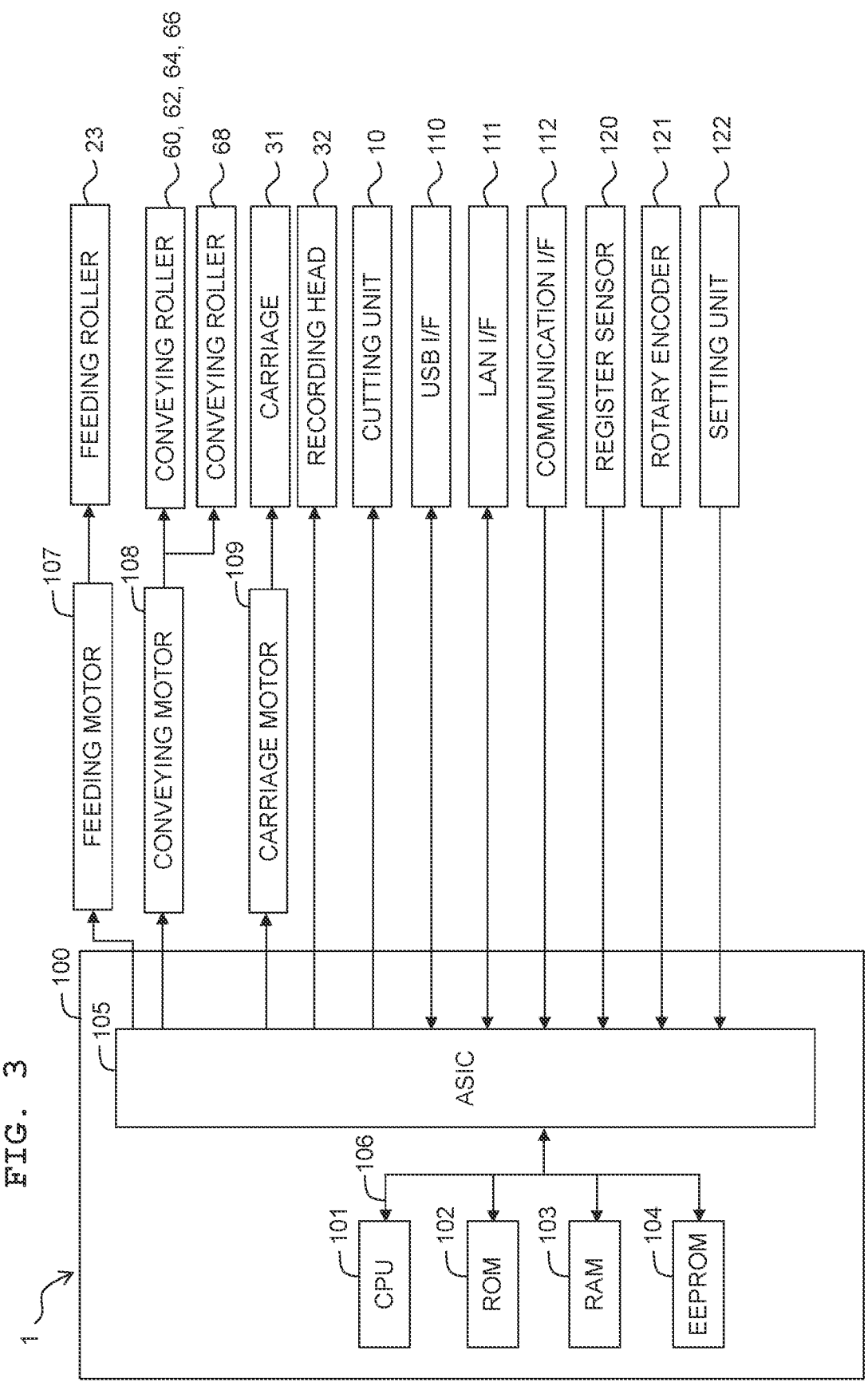
FIG. 3 is a block diagram depicting an electrical configuration of the printing apparatus.

FIG. 3 is a block diagram depicting the electrical configuration of the printing apparatus 1 of the first embodiment. As depicted in FIG. 3, in addition to the above-described parts, the printing apparatus 1 includes a feeding motor 107, the conveying motor 108, a carriage motor 109, the controller 100, a USB interface (I/F) 110, a LAN interface (I/F) 111, and a communication interface (I/F) 112.

The controller 100 includes a CPU (Central Processing Unit) 101, a ROM (Read Only Memory) 102, a RAM (Random Access Memory) 103, an EEPROM 104 (registered trademark), and an ASIC 105, which are connected by an internal bus 106. The ROM 102 contains program(s) that is used by the CPU 101 to control various operations, etc. The RAM 103 is used as a memory area that temporarily stores data, signal, and the like used when the CPU 101 executes program described above, or a work area for data processing when the CPU 101 executes program described above. The EEPROM 104 stores setting information that should be retained even after the power is turned off. The controller 100 controls the feeding motor 107, the conveying motor 108, the carriage motor 109, the recording head 32, and the cutting unit 10, etc., based on the control program read from the ROM 102.

The ASIC 105 is connected with the feeding motor 107, the conveying motor 108, the carriage motor 109, the recording head 32, the cutting unit 10, the USB interface (I/F) 110, the LAN interface (I/F) 111, the communication interface (I/F) 112, the register sensor 120, the rotary encoder 121, and the setting unit 122. The ASIC 105 supplies driving current to the feeding motor 107, the conveying motor 108, and the carriage motor 109. The controller 100 controls the rotation of the feeding motor 107, the conveying motor 108, and the carriage motor 109 by, for example, a PWM (Pulse Width Modulation) control.

The controller 100 applies a driving voltage to vibration elements of the recording head 32 to discharge ink droplets from the nozzles 33. In addition, the ASIC 105 is connected to the register sensor 120 and the rotary encoder 121. Then, the controller 100 detects the state of the printing apparatus 1 based on the signals output from the register sensor 120 and the rotary encoder 121.

Specifically, the controller 100 detects, based on the detection signal output from the register sensor 120, that the paper P has passed the position where the paper P contacts with the conveying roller 60. The controller 100 detects the amount of rotation of the conveying roller 60 based on the pulse signal output from the rotary encoder 121. Further, the controller 100 estimates a conveying amount of paper P in the first conveying route R1 based on the pulse signal output from the rotary encoder 121 after the ON signal is output from the register sensor 120.

The USB interface (I/F) 110 is connected with a USB memory, a USB cable, etc. A PC is connected to the LAN interface 111 via a LAN cable. The controller 100 receives a print job via the USB interface 110 or the LAN interface 111, and then the controller 100 records a printing data indicated by the print job to the paper P by controlling each part of the printing apparatus 1.

Flow of Control By the Controller

Figure 7:
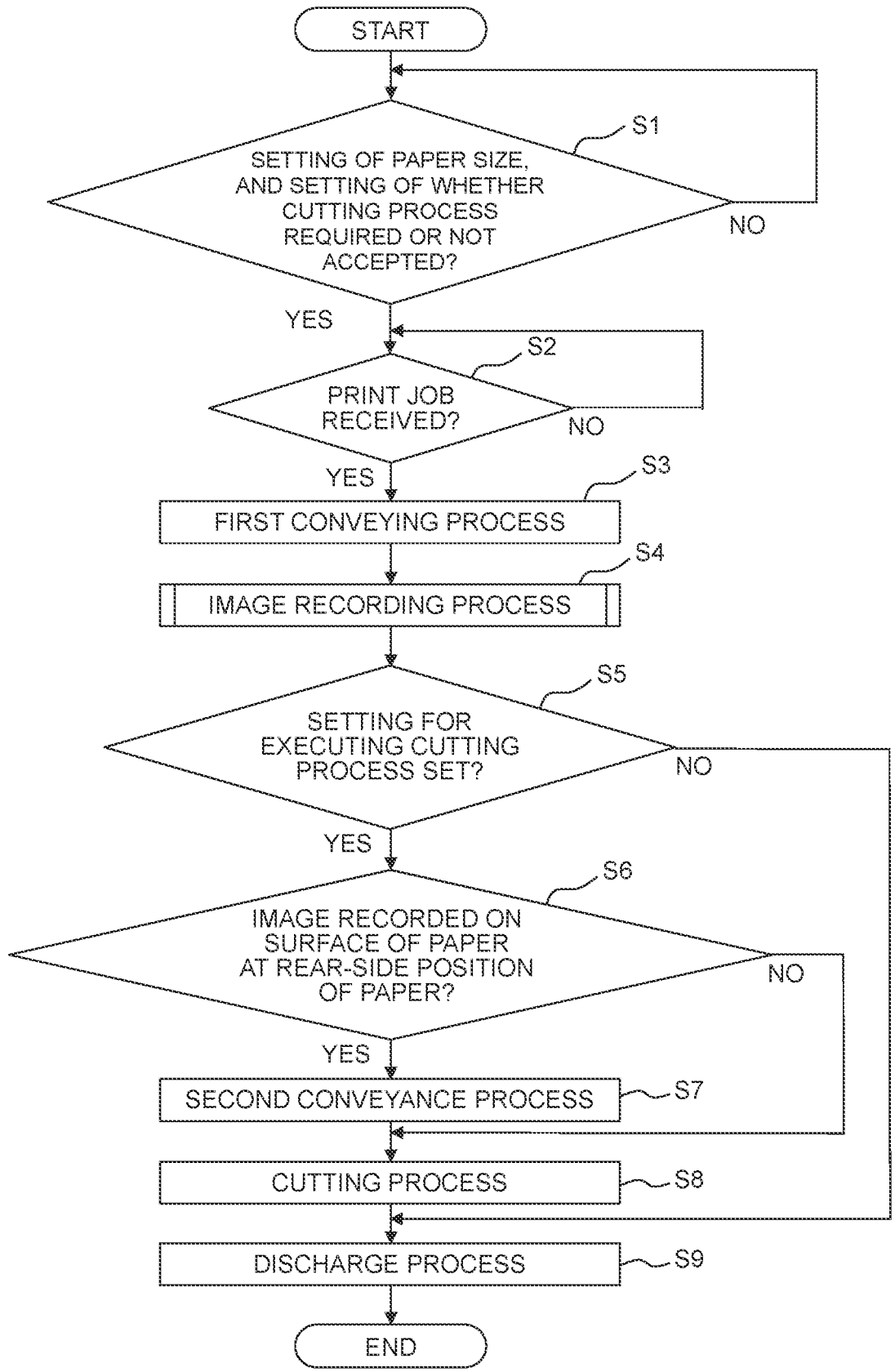
FIG. 7 is a flowchart depicting the flow of control by the controller of the printing apparatus.
Figure 8:
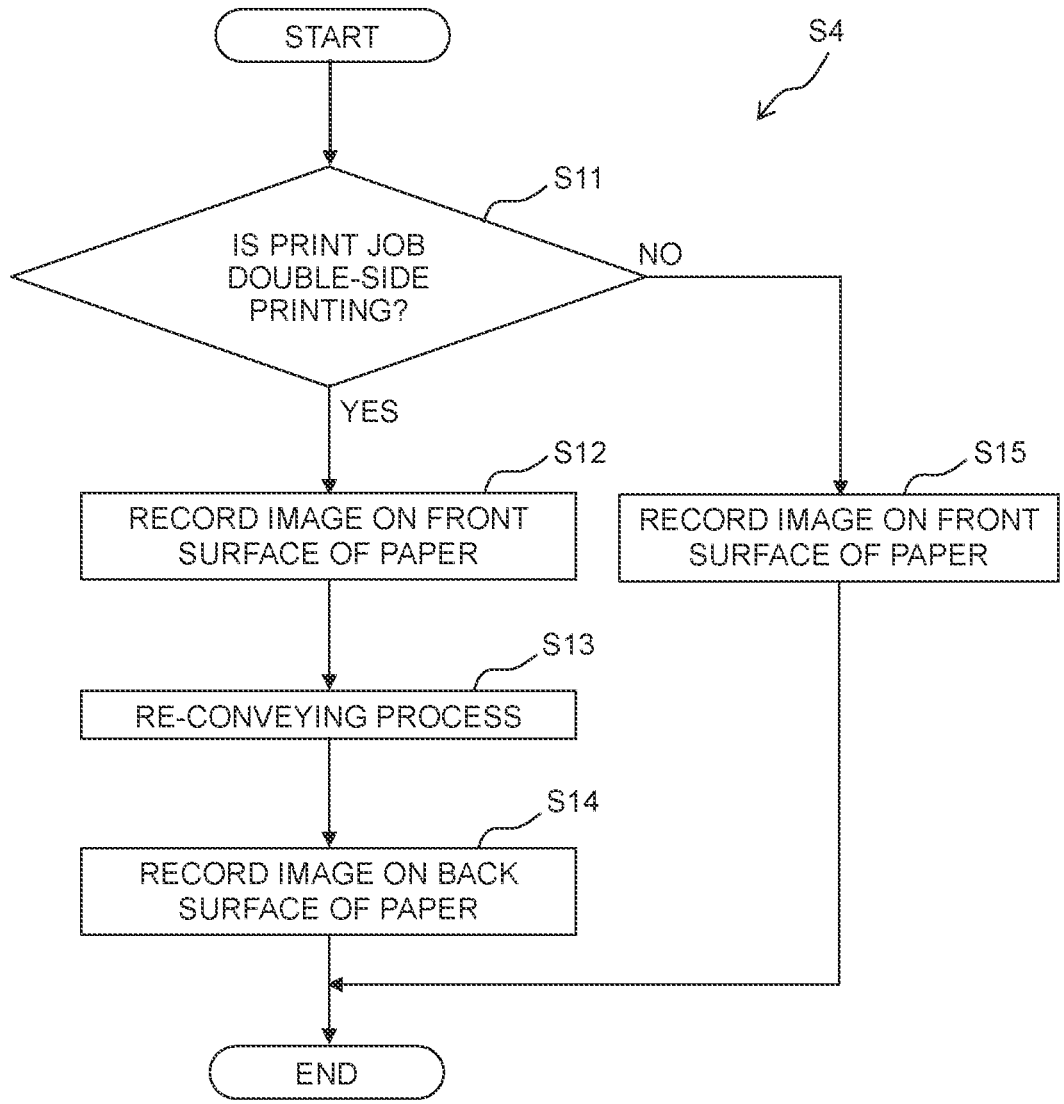
FIG. 8 is a flowchart depicting a flow of the image recording process of FIG. 7.

Next, the flow of a control by the controller 100 of the printing apparatus 1 according to the first embodiment will be explained with reference to the flowcharts in FIG. 7 and FIG. 8. FIG. 7 is a flowchart depicting the flow of the control by the controller 100 of the printing apparatus 1 according to the first embodiment. FIG. 8 is a flowchart depicting the flow of the image recording process (S4) in FIG. 7.

First, the user uses the setting unit 122 to set which of the paper P in the upper feeding tray 21 and the paper P in the lower feeding tray 21, among the upper and lower feeding trays 21 in FIG. 1, is used for the printing. In other words, the user sets which size of paper P, between A4 or A3, is to be used for the printing. Furthermore, the user sets whether or not the paper P used in the printing will be cut. Then, as depicted in FIG. 7, the controller 100 determines whether the setting of the size of paper P and the setting of whether or not the cutting process is required are accepted (step S1). In a case that the controller 100 has not accepted the setting of the size of the paper P and the setting of whether the cutting process is required or not in the step S1 (step S1: NO), the controller 100 displays a message on a display (not depicted) and returns the process to the step S1, the message intending to warn or advise the user to set the size of the paper P and to set whether the cutting process is required or not.

In a case that the setting of the size of the paper P and the setting of whether or not the cutting process is required is accepted (step S1: YES), the controller 100 determines whether or not a print job has been received via the USB interface 110 or the LAN interface 111, etc. (step S2). In a case that the print job has been received by the controller 100 (step S2: YES), the controller 100 proceeds the process to the step S3. In a case that the print job has not been received by the controller 100 (step S2: NO), the controller 100 returns the process to the step S2.

In the step S3, the controller 100 performs a first conveying process of conveying the paper P from the feeding tray 21 to the image recording unit 3 along the first conveying direction D1. Specifically, the controller 100 firstly drives the feeding motor 107 to rotate the feeding roller 23 positively and thereby conveying the paper P from the feeding tray 21 to a conveying starting position V in the first conveying route R1.

Then, when the front end of the paper P contacts the second flap 48, the second flap 48, which is maintained in the first state (see, solid line in FIG. 2) by its own weight, swings from the first state to the second state (see, dotted line in FIG. 2) by being pushed by the paper P. As a result, the second flap 48 guides the paper P, which is conveyed in the first conveying direction D1, along the curved guiding member 41 to the downstream in the first conveying direction D1 of the merging position W. Note that, after the rear end of the paper P has passed through the second flap 48, the second flap 48 swings from the second state to the first state by its own weight Then, when the front end of the paper P reaches the conveying roller 60, the controller 100 drives the conveying motor 108 to rotate the conveying rollers 60, 62, 64, 66, and thereby conveys the front end (a side of the front end) of the paper P to the image recording unit 3. Then, the controller 100 performs the image recording process of recording the image by the image recording unit 3 to the paper P having been conveyed to the image recording unit 3 (step S4).

FIG. 8 is a flowchart depicting a flow of the image recording process (step S4) of FIG. 7. As depicted in FIG. 8, firstly, the controller 100 determines whether the print job is double-sided printing or not (step S11). In a case that the controller 100 determines that the print job is the double-sided printing (step S11: YES), the controller 100 records images on the front surface of the paper P by alternately repeating the line feed process and the recording processes described below (step S12).

That is, in the line feed process, the controller 100 rotates the conveying motor 108 positively so as to drive the conveying rollers 60, 62, 64, 66, and thereby conveys the paper P in the first conveying direction D1 by a predetermined conveying amount. Further, in the recording process, the controller 100 cause the carriage 31 to move in the widthwise direction of the paper P by driving the carriage motor 109 and cause the nozzles 33 of the recording head 32 to discharge the ink droplets to the paper P, in a period in which the conveying of the paper P is stopped. By doing so, a part of the image corresponding to one line is recorded on the paper P.

The paper P on which the image is being recorded by the image recording unit 3 as well as the paper P on which the image has been recorded by the image recording unit 3 are conveyed by the conveying rollers 62, 64 in the first conveying route R1 in the conveying direction D1. When the front end of the paper P contacts the upper surface of the first flap 46, the first flap 46 swings in a direction separating from the guiding member 43 to turn into the second state. Thereafter, when the rear end of the paper P, conveyed in the first conveying direction D1 by the conveying roller 64 rotating positively, passes through the first flap 46, the first flap 46 swings from the second state to the first state by the biasing force of the coil spring 47.

After the step S12, the controller 100 performs a re-conveying process (step S13). Specifically, the controller 100 reverses the conveying motor 108 and rotates the conveying rollers 64, 66 in reverse direction, and thereby convey the paper P with the image recorded in the first conveying route R1 in the second conveying direction D2 being the opposite direction of the first conveying direction D1 (see, FIG. 4).

In this situation, the first flap 46 is rotated to the first state by the biasing force of the coil spring 47. That is, after the rear end of the paper P having passed through the first flap 46, the first conveying route R1 is closed by the first flap 46 due to the biasing force of the coil spring 47. Therefore, the paper P conveyed in the second conveying direction D2 in the first conveying route R1 is conveyed into the second conveying route R2 along the lower surface of the first flap 46, in a state that the rear end, in the first conveying direction D1, of the paper P behaves as a front end, in the second conveying direction D2, of the paper P. Then, the controller 100 rotates the conveying roller 68 to convey the paper P in the second conveying route R2, from the branching position Y to the conveying start position V.

Next, the controller 100 reversing the front and back surfaces of the paper P by conveying the paper P in the second conveying route R2 from the merging position W to the first conveying route R1, and then the controller 100 conveys the paper P to the image recording unit 3. Then, the controller 100 records an image on the back surface of the paper P by the image recording unit 3 (step S14).

On the other hand, in a case that the print job is not double-side printing (step S11: NO), the controller 100 records the image on the surface (front surface) of the paper P by alternately repeating the line feed process and the recording process described above (step S15). The controller 100 terminates the image recording process (step S4) depicted in FIG. 8, after the step S14 or the step S15.

Next, as depicted in FIG. 7, the controller 100 determines whether or not the cutting process is set to be executed by the setting unit 122 (step S5). In a case that the cutting process is set to be executed (step S5: YES), then the controller 100 determines whether or not the image is recorded on the surface of the paper P at a position defined in rear side of the paper P (step S6). On the other hand, in a case that the cutting process is not set to be executed (step S5: NO), the controller 100 proceeds the process to the step S9 without performing the cutting process (step S8).

In the step S6, in a case that the image is recorded at the position defined in rear side of the front surface of the paper P or in a case that the images are recorded at the positions defined in rear side of the front and back surfaces of the paper P (step S6: YES), the controller 100 performs the second conveying process (step S7) of conveying the paper P in the second conveying direction D2. Note that, in the first embodiment, the second conveying direction D2 is the direction in which the paper P passes the cutting position X oppositely to the first conveying direction D1, during the second conveying process (step S7) as depicted in FIG. 4.

Figure 4:
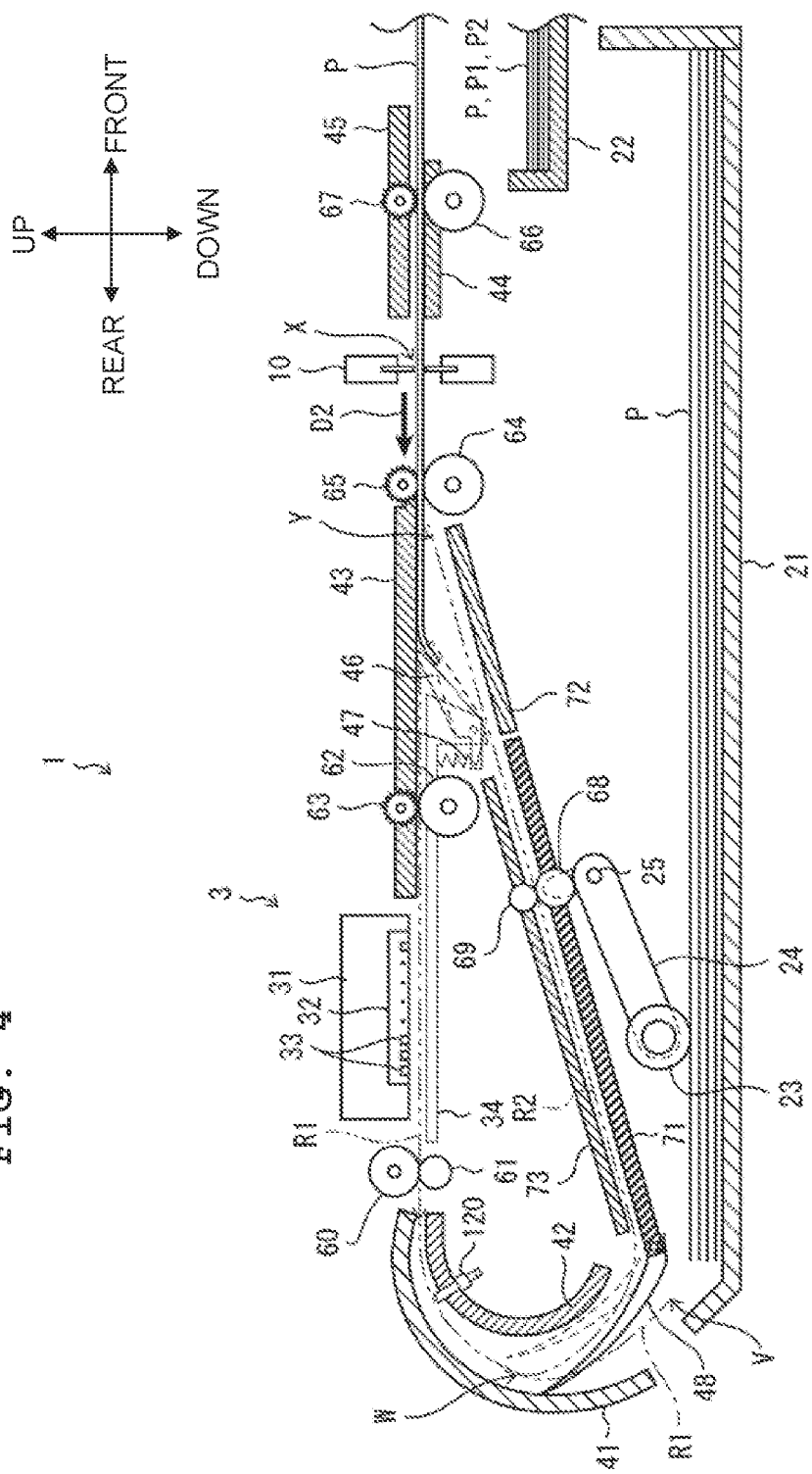
FIG. 4 is a figure corresponding to FIG. 2 depicting a position of a paper at the start of the second conveying process in the printing apparatus.

Here, the FIG. 4 depicts the position of the paper P in the printing apparatus 1 at the start of the second conveying process (step S7). As depicted in FIG. 4, after the image recording process (S4) is completed, the paper P is conveyed in the first conveying direction D1 until the rear end of the paper P passes through the first flap 46. That is, at the start of the second conveying process (step S7), the rear end of the paper P is located near the first flap 46. Note that, in the example depicted in FIG. 4, the lower feeding tray 21 is omitted for convenience of explanation. In the step S7, the controller 100 rotates the conveying rollers 64, 66, 68 in reverse direction to start the second conveying process. When the second conveying process is started, the paper P is conveyed to the second conveying route R2 along the lower surface of the first flap 46 in a state that the rear end in the first conveying direction D1 of the paper P behaves as the front end of the paper P.

Then, as depicted in FIG. 4, the controller 100 conveys the paper P in the second conveying route R2 in the second conveying direction D2 by a predetermined amount, and then stops the rotation of the conveying rollers 64, 66, 68 so as to stop the paper P. Here, the "predetermined amount" is a conveying amount set depending on a size of the paper P, the cutting position X of the cutting unit 10, etc. The larger the size of the paper P, the larger the predetermined amount. In this case, the controller 100 conveys the paper P in the second conveying direction D2 until the center position CL (see FIG. 6) of the paper P coincides with the cutting position X (see, FIG. 5). Note that the cutting position X means the position where the pair of blades on the top and bottom of the cutting unit 10 are in contact with each other.

On the other hand, in a case that image is recorded neither at a position defined in rear side of the front surface of the paper P nor at a position defined in rear side of the back surface of the pater P (step S6: NO), the controller 100 proceeds the process to the cutting process (step S8) described below without performing the second conveying process (S7). After the step S7, or in the case of NO in the step S6, the controller 100 controls the cutting unit 10 to perform the cutting process (S8).

Figure 5:
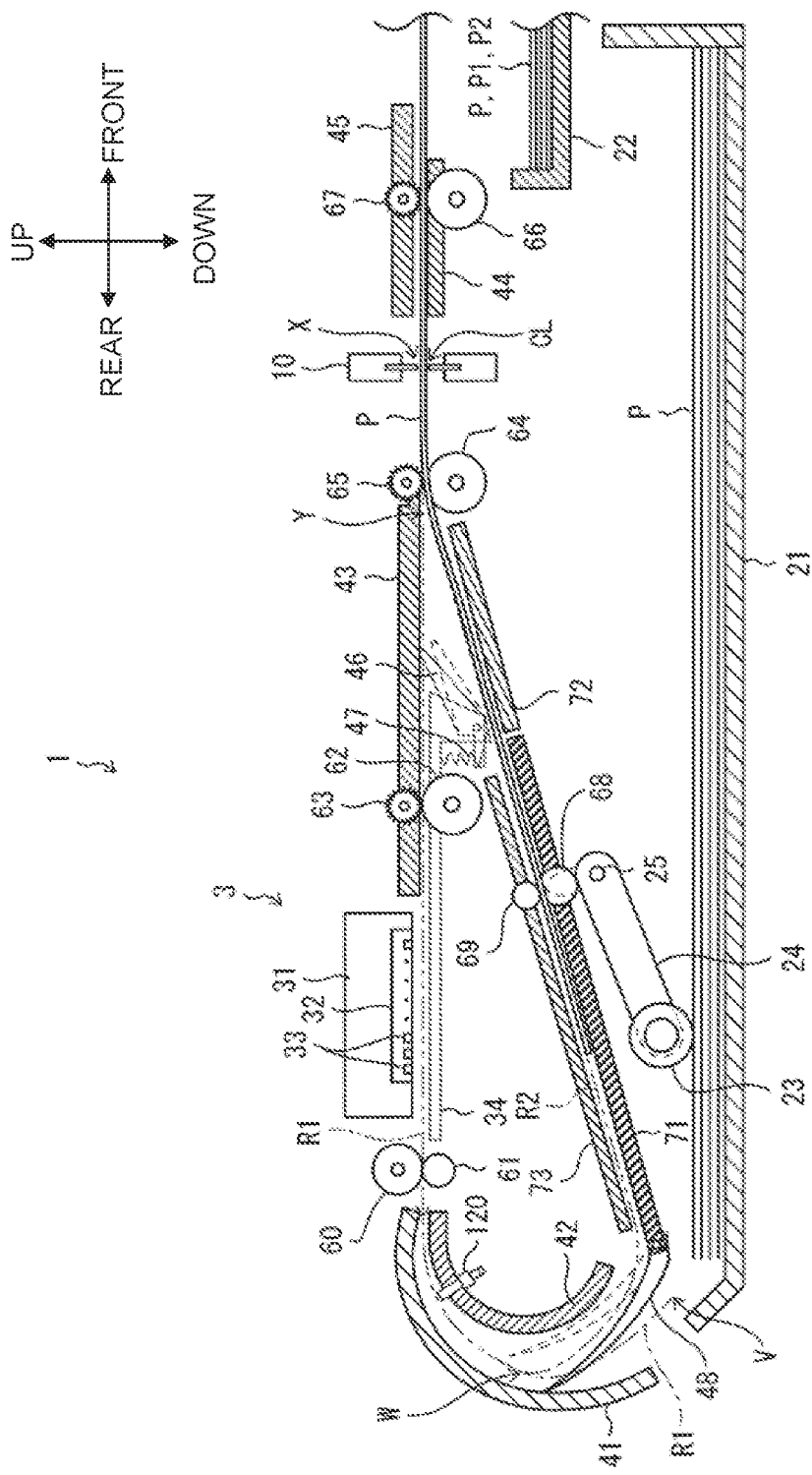
FIG. 5 is a figure corresponding to FIG. 2 depicting a position of a paper at the timing of the cutting process in the printing apparatus.

FIG. 5 depicts the position of paper P in the printing apparatus 1 during the cutting process (S8). In the step S8, the controller 100 cut the paper P in the widthwise direction of the paper P by controlling the cutting unit 10 in a state that the paper P is stopped at a predetermined position downstream of the roller 68 in the second conveying route R2, as depicted in FIG. 5.

Note that in an example depicted in FIG. 5, the lower feeding tray 21 is omitted for the convenience of the explanation.

FIG. 6 depicts the paper P before cutting and the first paper P1 and second paper P2 after cutting. In the example depicted in FIG. 6, the paper P is divided into the paper P1 and the paper P2 each having a size half of that of paper P, by being cut with the cutting unit 10. For example, if the size of the paper P is A4 size, the first paper P1 and the second paper P2 each having A5 size are generated. Note that, in the example depicted in FIG. 6, the paper P is cut into one-half pieces. However, there is no limitation thereto. For example, the paper P may be cut into one-third. The position at which the paper P is cut can be appropriately changed depending on the size of the print data.

After the step S8, the controller 100 performs the discharge process of discharging the first paper P1 and the second paper P2 to the discharge tray 22 (step S9). Specifically, the controller 100 rotates the conveying roller 66 positively to convey the first paper P1 to the discharge tray 22. Further, the controller 100 rotates the conveying roller 68 in reverse direction and rotates the conveying rollers 64, 66 positively, so that the second paper P2 is conveyed in the first conveying direction D1 in the second conveying route R2 to the branching position Y in the first conveying route R1 and then the second paper P2 is conveyed to the discharge tray 22. In this way, the flow depicted in FIG. 7 is completed.

In the printing apparatus 1 according to the first embodiment described above, the controller 100 conveys the paper P on which the image has been recorded in the image recording process (step S4) in the second conveying direction D2 in the second conveying process (step S7), and then cut the paper P with the cutting unit 10. Therefore, it is possible to prevent image deviation and the like from being caused, the image deviation and the like being otherwise caused if the paper P was cut during the image recording process (step S4). By doing so, it is possible to cut the paper P with the image recorded without deteriorating the quality of image recording.

The controller 100 conveys the paper P in the second conveying direction D2 in the second conveying process (step S7), and then performs the cutting process (step S8). As a result, even if the position of the cutting unit 10 and the position of the image recording unit 3 are close to each other in the first conveying direction D1, it is possible to cut the paper P after the completion of the image recording process (step S4). Therefore, it is possible to downsize the printing apparatus 1 by making the position of the cutting unit 10 and the position of the image recording unit 3 closer to each other in the first conveying direction D1.

In addition, the controller 100 conveys the paper P to the second conveying route R2 in the second conveying process (step S7), and cut the paper P in the cutting process (step S8) in a state that a front side of the paper P in the second conveying direction D2 is positioned in the second conveying route R2. This prevents adhesion of stains such as ink or the like to the paper P, that may be otherwise caused due to contact between the paper P and the platen 34 during cutting.

The distance LX in the first conveying direction D1 from the cutting position X where the cutting unit 10 cuts the paper P to the position of the most upstream nozzle(s) 33, of the plurality of nozzles 33, in the first conveying direction D1 is shorter than half of the length L in the front-rear direction of the feeding tray 21 (see FIG. 2). Therefore, by making the cutting unit 10 closer to the image recording unit 3 in the first conveying direction D1, the length in the front-rear direction of the printing apparatus 1 can be shortened and thus the printing apparatus 1 can be downsized.

In addition, in the second conveying process (step S7), the controller 100 conveys the paper P in the second conveying direction D2 by an appropriate conveying amount depending on the size of the paper P set by the user via the setting unit 122. This allows the paper P to be cut accurately at a desired position.

The controller 100 does not execute the second conveying process (S7) in a case that the image is recorded, in the image recording process (S4), only at a position defined in front side of the surface(s) of the paper P by the image recording unit 3. This allows the unnecessary second conveying process (S7) to be omitted, and thus the process of the printing apparatus 1 can be simplified.

Second Embodiment

Next, the printing apparatus 1A according to the second embodiment of the present disclosure will be explained with reference to FIG. 9 to FIG. 11. Note that, for convenience of explanation, members having the same functions as those described in the first embodiment are indicated with the references same as those in the first embodiment, and the description therefor will not be repeated.

Configuration of the Printing Apparatus

Figure 9:
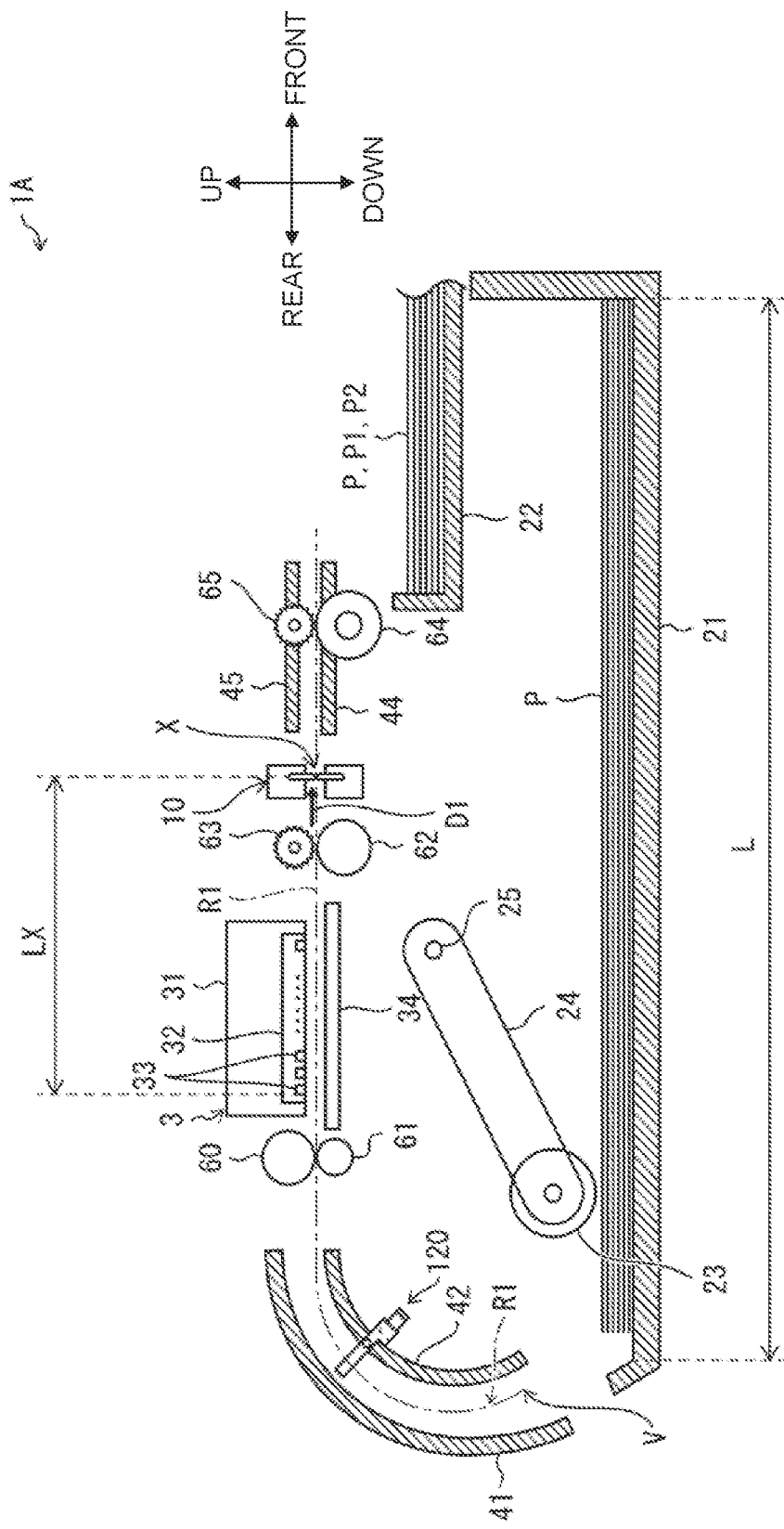
FIG. 9 is a cross-sectional view depicting an internal structure of the printing apparatus.

FIG. 9 is a cross-sectional view depicting the internal structure of the printing apparatus 1A according to the second embodiment. As depicted in FIG. 9, the printing apparatus 1A of the second embodiment differs from the printing apparatus 1 of the first embodiment in that the second conveying route R2 is not provided. In other words, in the printing apparatus 1A of the second embodiment, double-sided printing is not performed unlike the printing apparatus 1 of the first embodiment.

As depicted in FIG. 9, the printing apparatus 1A includes the feeding tray 21, the discharge tray 22, the feeding roller 23, the first conveying route R1, the conveying roller 60, the image recording unit 3, the conveying roller 62, the conveying roller 64, and the cutting unit 10.

The first conveying route R1 is a route that extends upward from the rear end of the feeding tray 21, curves in the area defined by the guiding members 41, 42, extends straightly in the area defined by the guiding members 44, 45 via the position of the image recording unit 3, and reaches the discharge tray 22.

The conveying roller 60 is arranged at a position in the first conveying route R1 upstream in the first conveying direction D1 of the image recording unit 3. A pinch roller 61 is arranged at a position opposing to the lower part of the conveying roller 60. The conveying roller 60 is driven by the conveying motor 108 (see, FIG. 3). The pinch roller 61 rotates owing to the rotation of the conveying roller 60. When the conveying roller 60 and the pinch roller 61 rotate positively, the paper P is pinched between the conveying roller 60 and the pinch roller 61, and is conveyed to the image recording unit 3.

In the first conveying route R1, the conveying roller 62 is arranged at a position downstream in the first conveying direction D1 of the image recording unit 3. A spur roller 63 is arranged at a position opposing to the upper part of the conveying roller 62. The conveying roller 62 is driven by the conveying motor 108 (see, FIG. 3). The spur roller 63 rotates owing to the rotation of the conveying roller 62. When the conveying roller 62 and the spur roller 63 rotate positively, the paper P is pinched between the conveying roller 62 and the spur roller 63, and is conveyed to the cutting unit 10.

As depicted in FIG. 9, the cutting unit 10 is arranged in the first conveying route R1 at a position between the conveying roller 62 and the conveying roller 64. Specifically, the distance LX in the first conveying direction D1, from the cutting position X of the cutting unit 10 to the position of the nozzle(s) 33, of the plurality of nozzles 33, arranged most upstream in the first conveying direction D1 is shorter than a half of the length L being the length of the feeding tray 21 in the front-rear direction. Here, the length L in the front-rear direction of the feeding tray 21 means a length from the front inner wall to the rear inner wall of the feeding tray 21.

In the first conveying route R1, the conveying roller 64 is arranged at a position downstream in the first conveying direction D1 of the cutting unit 10. A spur roller 65 is arranged at a position opposing to the upper part of the conveying roller 64. The conveying roller 64 is driven by the conveying motor 108 (see, FIG. 3). The spur roller 65 rotates owing to the rotation of the conveying roller 64. As the conveying roller 64 and the spur roller 65 rotate positively, the paper P, the first paper P1 and the second paper P2 are pinched by the conveying roller 64 and the spur roller 65, and are discharged to the discharge tray 22.

Control Action of the Controller

Next, the flow of control by the controller 100 of the printing apparatus 1A according to the second embodiment will be explained with reference to the flowchart in FIG. 7, and FIGS. 10 and 11. Here, only points that differ from the flow of control by the printing apparatus 1 of the first embodiment will be explained.

Figure 10:
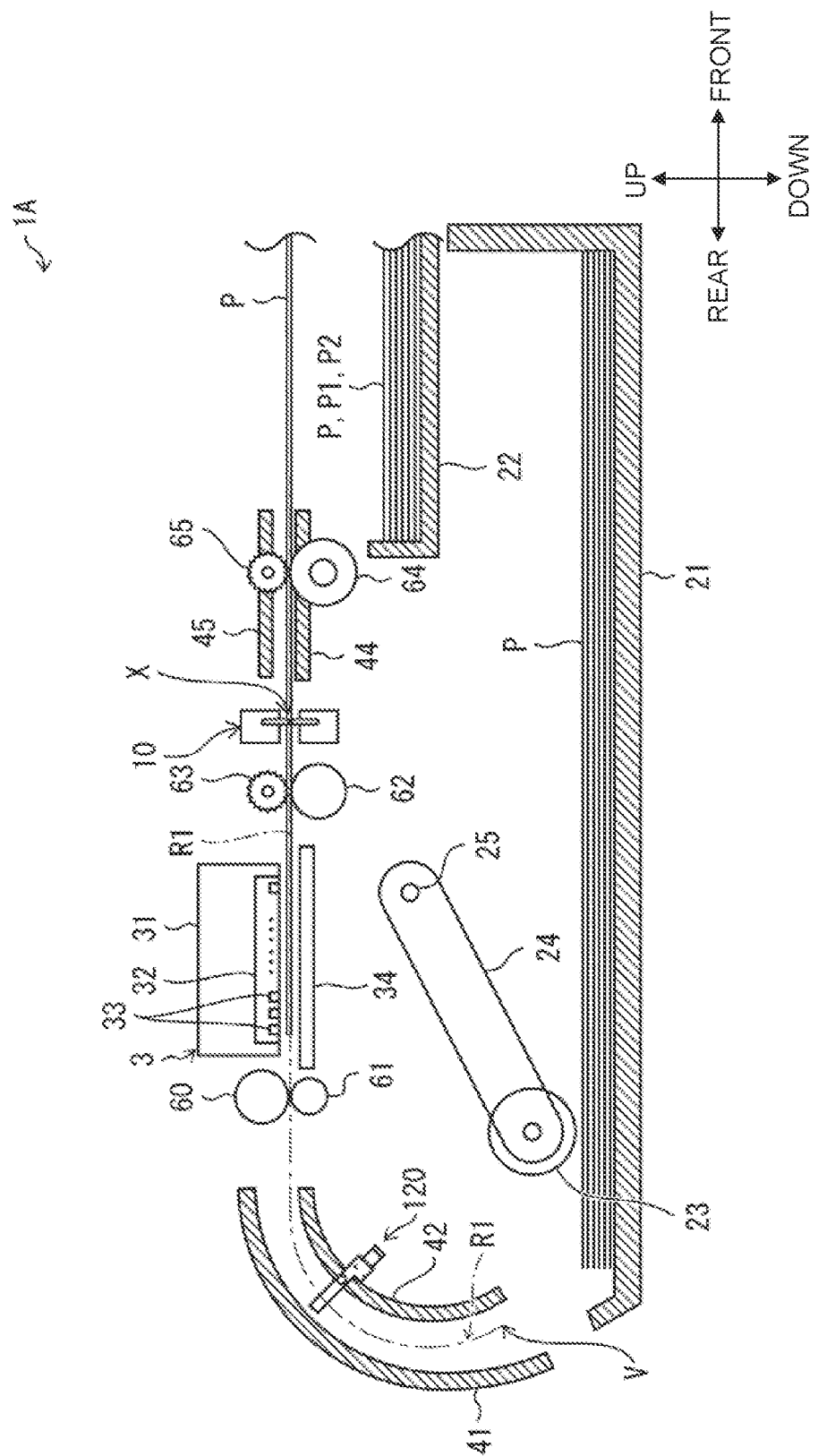
FIG. 10 is a figure corresponding to FIG. 9 depicting a position of a paper at the end of the image recording process in the printing apparatus.
Figure 11:
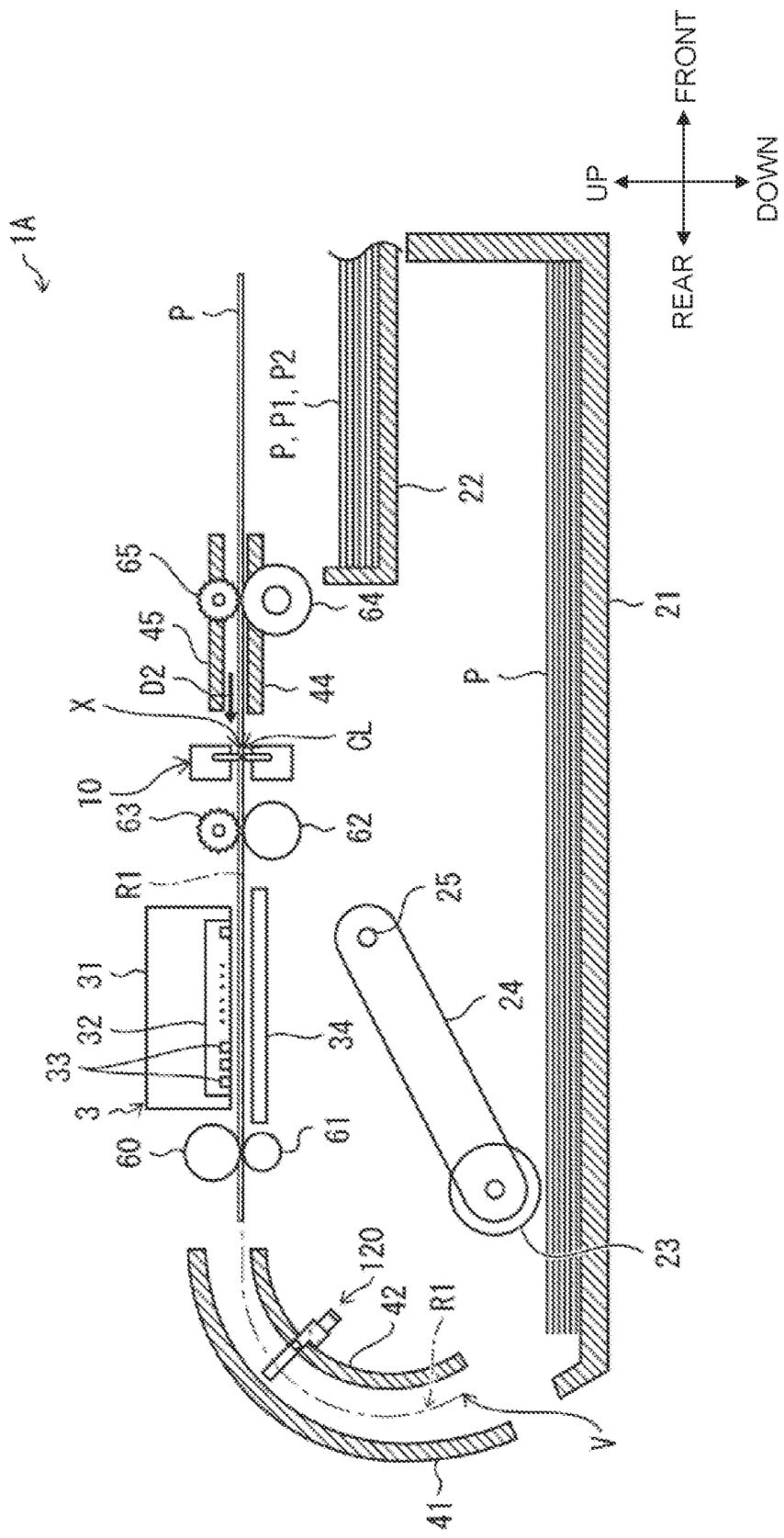
FIG. 11 is a figure corresponding to FIG. 9 depicting a position of a paper at the timing of the cutting process in the printing apparatus.

FIG. 10 depicts the position of the paper P in the printing apparatus 1A of the second embodiment at the end of the image recording process (S4). FIG. 11 depicts the position of paper P in the printing apparatus 1A of the second embodiment at the time of the cutting process (step S8).

In the second embodiment, the controller 100 executes the second conveying process of the step S7 depicted in FIG. 7. In the second conveying process, the controller 100 conveys the paper P in the second conveying direction D2 by a predetermined amount, from the position depicted in FIG. 10 to the position where the center position CL of the paper P depicted in FIG. 11 coincides with the cutting position X of the cutting unit 10, and then the controller 100 stops the paper P. That is, the controller 100 switchbacks the paper P in the first conveying route R1 by a predetermined amount in the second conveying direction D2, by rotating the conveying rollers 60, 62, 64 in reverse direction. Note that, in the second embodiment, the second conveying direction D2 is the direction in which the paper P passes the cutting position X oppositely to the first conveying direction D1, during the second conveying process (step S7).

Then, in the cutting process (step S8), the controller 100 cuts the paper P with the cutting unit 10. Specifically, as depicted in FIG. 11, the paper P is cut in a state that a front end in the second conveying direction D2 of the paper P is arranged in the first conveying route R1 at a position upstream in the first conveying direction D1 of the image recording unit 3.

After the step S8, the controller 100 rotates the conveying rollers 60, 62, 64 positively to convey the first paper P1 and the second paper P2 in the first conveying direction D1 in the first conveying route R1 and to discharge the first paper P1 and the second paper P2 to the discharge tray 22 (step S9). Note that in the second embodiment, the conveying rollers 60, 62, 64 are an example of the first conveyor. In the second embodiment, the conveying rollers 60, 62, 64 are an example of the second conveyor.

In the printing apparatus 1A of the second embodiment described above, it is sufficient that the controller 100 conveys the paper P in the second conveying direction D2 in the first conveying route R1, in the second conveying process (step S7). Thus, unlike the first embodiment, it is not necessary to provide the second conveying route R2. Owing to such configuration, it is possible to cut the paper P with the recorded image, by a simple configuration, without deteriorating the quality of image recording. In addition, the amount of conveying to be conveyed in the second conveying direction D2 can be made shorter than that in the first embodiment. This allows the process time of the printing apparatus 1A to be reduced.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Other Embodiments

The printing apparatus 1 of the first embodiment described above is the inkjet printer in serial-system. However, there is no limitation thereto. The printing apparatus 1 may be an inkjet printer in a line-system, for example. Further, the printing system is not limited to inkjet-system, but may also be electrophotographic-system.

In the printing apparatus 1 of the first embodiment described above, two feeding trays 21 are arranged. However, there is no limitation thereto. For example, one feeding tray 21 may be arranged. In addition, in the above, the paper P is conveyed by using the conveying rollers 60, 62, 64, 66, 68 being rolling members. However, there is no limitation thereto. It is possible to use a belt member and/or a drum member.

The controller 100 is configured to receive the print job via the USB interface 110 or the LAN interface 111. However, there is no limitation thereto. The controller 100 may receive the print job by using wireless communication.

In the printing apparatus 1 of the first embodiment described above, the controller 100 cuts the paper P in the widthwise direction of the paper P with the cutting unit 10, in a state that the paper P is stopped. However, there is no limitation thereto. For example, the paper P may be cut while the paper P is conveyed at a slower speed than usual.

The present disclosure is not limited to the above-described embodiments, and various changes are possible within the scope of the claims. Any embodiments obtained by combining technical means disclosed respectively in the different embodiments as appropriate are also included in the technical scope of the invention.

What is claimed is:

1. A printing apparatus comprising:
a holder configured to accommodate a plurality of sheets in a manner that the plurality of sheets is stacked to each other;
an image recorder configured to record an image on each of the plurality of sheets;
a receiver to which each of the plurality of sheets with the image recorded by the image recorder is to be discharged;
a cutter arranged on a receiver-side of the image recorder, the cutter being configured to cut each of the plurality of sheets at a cutting position, the receiver-side being a side of the image recorder at which the receiver is positioned;
a first conveyor configured to convey each of the plurality of sheets along a first conveying direction, the first conveying direction being a direction in which one of the plurality of sheets passes through the cutting position in a period in which recording of the image on the one of the plurality of sheets is performed by the image recorder; and
a controller, wherein
the controller is configured to execute:
a first conveying process of conveying the one of the plurality of sheets by the first conveyor along the first conveying direction to the image recorder;
an image recording process of recording the image on the one of the plurality of sheets by the image recorder;
a second conveying process of conveying the one of the plurality of sheets with the image recorded in a second conveying direction opposite to the first conveying direction by a predetermined amount, after the image recording process; and a cutting process of cutting the one of the plurality of sheets by the cutter, after the second conveying process.

2. The printing apparatus according to claim 1, further comprising:

a first conveying route configured to convey each of the plurality of sheets accommodated in the holder to the receiver along the first conveying direction;

a second conveying route branched from the first conveying route at a branching position of the first conveying route to extend along the second conveying direction, the branching position being arranged downstream in the first conveying direction of the image recorder; and a second conveyor configured to convey each of the plurality of sheets in the second conveying route along the second conveying direction, wherein the controller is configured to:

convey the one of the plurality of sheets by the first conveyor in the first conveying direction, in the first conveying process;

convey the one of the plurality of sheets in the second conveying direction in the second conveying route by the second conveyor, in the second conveying process; and cut the one of the plurality of sheets by the cutter in a state that a rear end in the first conveying direction of the one of the plurality of sheets is positioned in the second conveying route, in the cutting process.

3. The printing apparatus according to claim 2, wherein the second conveying route is connected to the first conveying route at a merging position of the first conveying route, the merging position being arranged upstream of the image recorder in the first conveying direction.

4. The printing apparatus according to claim 1, further comprising a first conveying route configured to convey each of the plurality of sheets accommodated in the holder along the first conveying direction to the image recorder, wherein the controller is configured to:

convey the one of the plurality of sheets in the first conveying route in the second conveying direction, in the second conveying process; and cut the one of the plurality of sheets by the cutter in a state that a rear end in the first conveying direction of the one of the plurality of sheets is positioned upstream in the first conveying direction of the image recorder in the first conveying route, in the cutting process.

5. The printing apparatus according to claim 1, wherein:

the image recorder includes a recording head having a plurality of nozzles; and a distance in the first conveying direction between a most upstream nozzle position and the cutting position is shorter than a half of a length in a front-rear direction of the holder, the most upstream nozzle position being a position at which a nozzle, of the plurality of nozzles, arranged most upstream in the first conveying direction is positioned.

6. The printing apparatus according to claim 1, further comprising an interface configured to receive a setting regarding a size of the one of the plurality of sheets and a setting regarding whether the cutting process is to be executed or not, wherein the controller is configured to convey the one of the plurality of sheets in the second conveying direction by the predetermined amount in the second conveying process, the predetermined amount being a conveyance amount corresponding to the size of the one of the plurality of sheets set via the interface.

7. The printing apparatus according to claim 1, wherein the controller is configured to execute the second conveying process in a case that the image is recorded by the image recorder on a surface of the one of the plurality of sheets at a front side part of the surface and a rear side part of the surface in the image recording process, and is configured not to execute the second conveying process in a case that the image is recorded by the image recorder only on the front side part of the surface of the one of the plurality of sheets in the image recording process.

* * * * *